United States Patent [19]
Imai et al.

[11] Patent Number: 5,428,755
[45] Date of Patent: Jun. 27, 1995

[54] METHOD FOR AUTOMATICALLY MODIFYING PROGRAM IN A FLASH MEMORY OF A MAGNETIC TAPE UNIT

[75] Inventors: Eiji Imai; Toshirou Shiomi; Satoshi Saitou, all of Shimosuwa, Japan

[73] Assignee: Sankyo Seiki Mfg. Co., Ltd., Nagano, Japan

[21] Appl. No.: 29,893

[22] Filed: Mar. 11, 1993

[30] Foreign Application Priority Data

Mar. 16, 1992 [JP] Japan .................. 4-058218

[51] Int. Cl.[6] .............................................. G06F 7/22
[52] U.S. Cl. .......................... 395/375; 364/DIG. 1; 364/DIG. 2; 364/222.81; 364/222.82; 364/236.3; 364/236.4; 364/248.2; 364/249; 364/261; 364/939.3; 364/952.4; 364/952.6; 364/962; 364/962.1
[58] Field of Search .................. 364/DIG. 1 MS File, 364/DIG. 2 MS File; 395/164, 162, 200, 375, 500, 575, 400, 425, 700, 800; 371/10.1, 12

[56] References Cited

U.S. PATENT DOCUMENTS 5,327,531 7/1994 Bealkowski et al. ................ 395/164

*Primary Examiner*—Robert B. Harrell
*Attorney, Agent, or Firm*—McAulay Fisher Nissen Goldberg & Kiel

[57] ABSTRACT

A method for modifying program of a magnetic tape unit comprising a flash memory for storing programs a storage memory and a CPU for executing the programs stored in the flash memory and storage memory is provided. The method comprises steps of storing a program for rewriting program in the storage memory, making a discrimination when a magnetic tape is mounted in the magnetic tape unit whether the magnetic tape is a normally used recording medium or a medium for modifying program, reading a program to be modified reproduced from the magnetic tape into a buffer when the magnetic tape is the medium for modifying program, and erasing the contents of the flash memory by the CPU by use of the program for rewriting program stored in the storage memory to transfer the program to be modified from the buffer to the flash memory. Thus the magnetic tape unit automatically modifies the program even if the operator does not modify or notice the program to the magnetic tape unit by way of a special command or connector, so that no special connector or application program for the host need be provided. Furthermore, the streamer need not be taken out by disassembling a case and the like, so that the operator can modify the programs easily.

5 Claims, 2 Drawing Sheets

METHOD FOR AUTOMATICALLY MODIFYING PROGRAM IN A FLASH MEMORY OF A MAGNETIC TAPE UNIT

BACKGROUND OF THE INVENTION

1. Field of the Invention

The present invention relates to a method for modifying a program of a magnetic tape unit such as a streamer for backing up data.

2. Description of the Related Art

In a magnetic tape unit such as a streamer for backing up data, various programs for operating the magnetic tape unit are stored in a ROM and are executed by a CPU. In this case, such ROM is divided into a removable EPROM and another ROM to accommodate a change in specification of the program and an occurrence of failure after shipping the magnetic tape unit. That is, part of the programs whose specification might be modified are stored in the EPROM and another part is stored in the other ROM. The EPROM is removably attached to a socket without soldering and the other ROM uses a ROM and the like in the CPU.

When a specification of a program is to be modified, the EPROM is removed from the socket to rewrite the program in the EPROM as a program whose specification has been modified and is then attached again.

However, it is cumbersome to remove the EPROM from the socket to rewrite the program and then to reattach it into the socket. Moreover, since the magnetic tape unit is usually built in a case, it is necessary to disassemble the case, which involves cumbersome work.

A method of using a flash memory which is electrically erasable instead of an EPROM and of providing a special connector in front of the magnetic tape unit has been considered. When a specification of a program has been modified, the contents of the flash memory are erased and the program is transferred by serial communication from the outside via the connector to write the program into the flash memory. With this method however, although a case in which the magnetic tape unit is incorporated does not have to be disassembled, a special connector needs to be provided. This increases the cost and causes problems wherein the connector may be damaged and be illegally used since it is readily accessed by an operator and is broken by static electricity of the human body.

When a specification of a program has been modified, a method of transferring a program from a host computer (hereinafter referred to as the host) utilizing an interface such as SCSI, which the magnetic tape unit has between the host after erasing the contents of the flash memory to rewrite the program to the flash memory, is conceivable. According to this method, however, the host must read the program, so that a special application program needs to be provided in the host.

OBJECT AND SUMMARY OF THE INVENTION

Accordingly, it is an object of the present invention to overcome the aforementioned disadvantages by providing a method for modifying a program of a magnetic tape unit which simply allows the program to be modified without providing such a special connector or application program in the host.

In order to achieve the aforementioned object, according to the present invention, a method for modifying the program of a magnetic tape unit comprising a flash memory for storing programs and a CPU for executing the programs stored in the flash memory and storage means is provided, comprising the steps of storing a program for rewriting program in the storage means, performing a discrimination step when a magnetic tape is mounted in the magnetic tape unit as to whether the magnetic tape is a normally used recording medium or a medium for modifying program, reading a program to be modified reproduced from the magnetic tape into a buffer when the magnetic tape is the medium for modifying program, and erasing the content of the flash memory by the CPU by means of the program for rewriting program stored in the storage means to transfer the program to be modified from the buffer to the flash memory.

Thus, the magnetic tape unit (or streamer) automatically modifies the program even if the operator does not modify or notice the program to the magnetic tape unit by means of a special command or connector, so that no special connector or application program for the host need be provided. Furthermore, the streamer need not be taken out by disassembling a case and the like, so that the operator can modify the programs easily.

For a better understanding of the present invention, reference is made to the following description and accompanying drawings while the scope of the invention will be pointed out in the appended claims.

DETAILED DESCRIPTION OF PREFERRED EMBODIMENT

Figure 1:
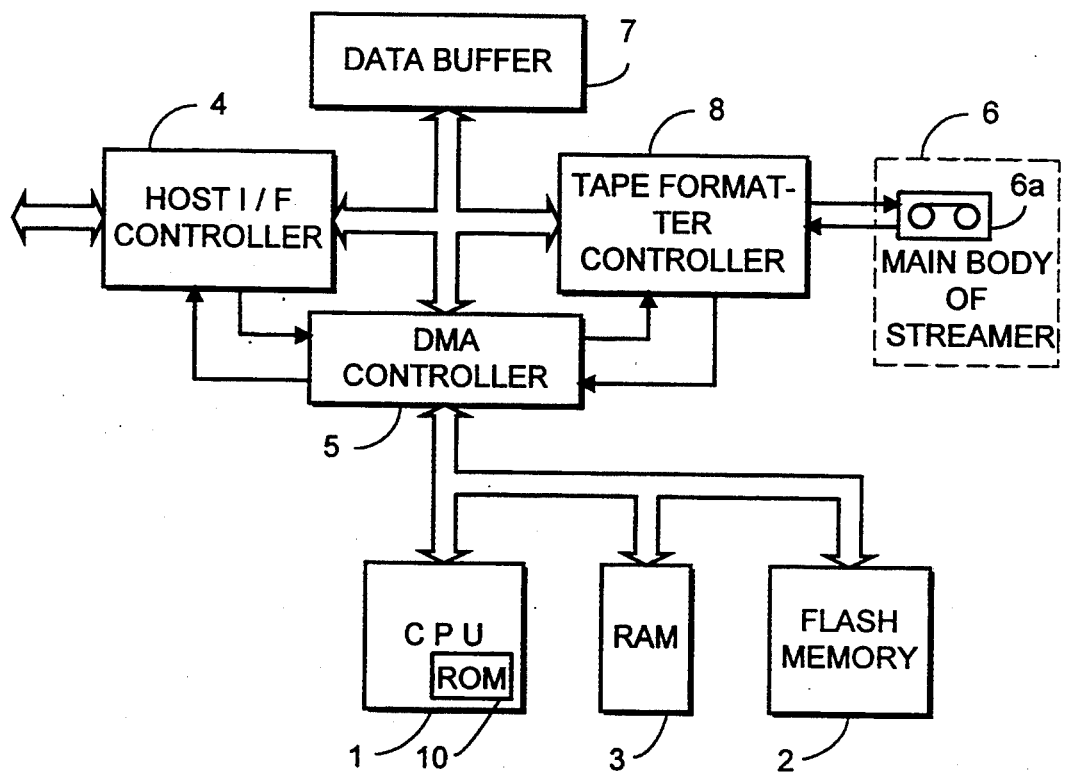
FIG. 1 a block diagram illustrating a part of one example of a streamer in which the present invention is applied.

Referring now to the drawings, a preferred embodiment of the present invention will be explained in detail. FIG. 1 shows one example of a magnetic tape unit in which the present invention is applied. This magnetic tape unit is an example of a streamer for backing up data and a ROM 10 storage means within a CPU 1 and a flash memory 2 contain programs for operating the streamer and for modifying the program. Part of the program for operating the streamer whose specification might be modified is stored in the flash memory 2 and the other part is stored in the ROM 10 within the CPU 1. The ROM 10 and the CPU 1 may be provided separately.

The CPU 1 operates the streamer by executing the programs stored in the ROM 10 within the CPU 1 and in the flash memory 2 by using a RAM 3 and controls a DMA controller 5 and a main body 6 of the streamer by means of commands input from the host through the intermediary of a host I/F (interface) controller 4.

Normally when data is recorded into a magnetic tape, the data is transferred by DMA direct memory access transfer by the DMA controller 5 from the host to a data buffer 7 through the intermediary of the host I/F controller 4. Data is also transferred by DMA transfer by the DMA controller 5 from the data buffer 7 to the main body 6 through the intermediary of a tape formatter controller 8. A cassette 6a, which is a medium comprised of a normally used magnetic tape, is set in the main body 6 and the magnetic tape in the cassette 6a is driven by a motor for running magnetic tape to record data from the tape formatter controller 8 by means of a magnetic head. When data is to be reproduced from the magnetic tape, the magnetic tape in the cassette 6a is driven by the motor for running magnetic tape to reproduce data by the magnetic head. The data is transferred by the DMA controller 5 to the data buffer 7 through the intermediary of the tape formatter controller 8 and is transferred by DMA transfer by the DMA controller 5 from the data buffer 7 to the host through the intermediary of the host I/F controller 4.

Figure 2:
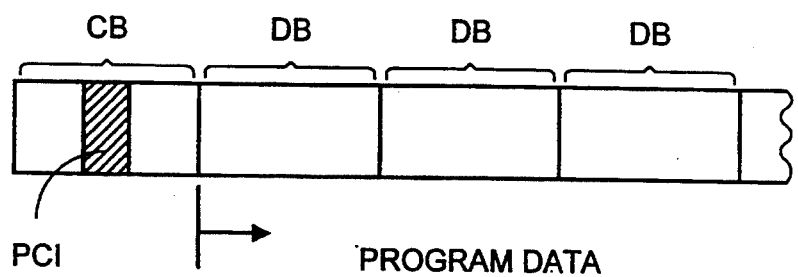
FIG. 2 a drawing illustrating a data format of a magnetic tape for modifying program used for the streamer in FIG. 1.

When a program stored in the flash memory 2 among the programs for the streamer is to be modified due to a change in specification of the program or to an occurrence of a failure after shipping the streamer, the program to be modified is recorded in the magnetic tape in the cassette sequentially per each data block DB and a medium for modifying program is prepared by recording on the head block CB of the magnetic tape in the cassette an information PCI indicating that the magnetic tape in the cassette is a medium for modifying program and control data containing information necessary for modifying the program as shown in Fig. 2. The cassette is then set in the main body 6. This cassette is the same as the cassette 6a for a normally used magnetic tape.

This streamer uses the magnetic tape for modifying program in the cassette as an interface with the outside and modifies a program by reproducing the program, instead of normal data, from the magnetic tape for modifying program. Accordingly, the streamer automatically changes the programs even if the operator does not modify or notice a program to the streamer by means of a special command, dip switch or connector, so that no special connector or special application program for the host need to be provided. Furthermore, the streamer needs not be taken out by disassembling a case and the like, so that the operator can modify programs easily.

Figure 3:
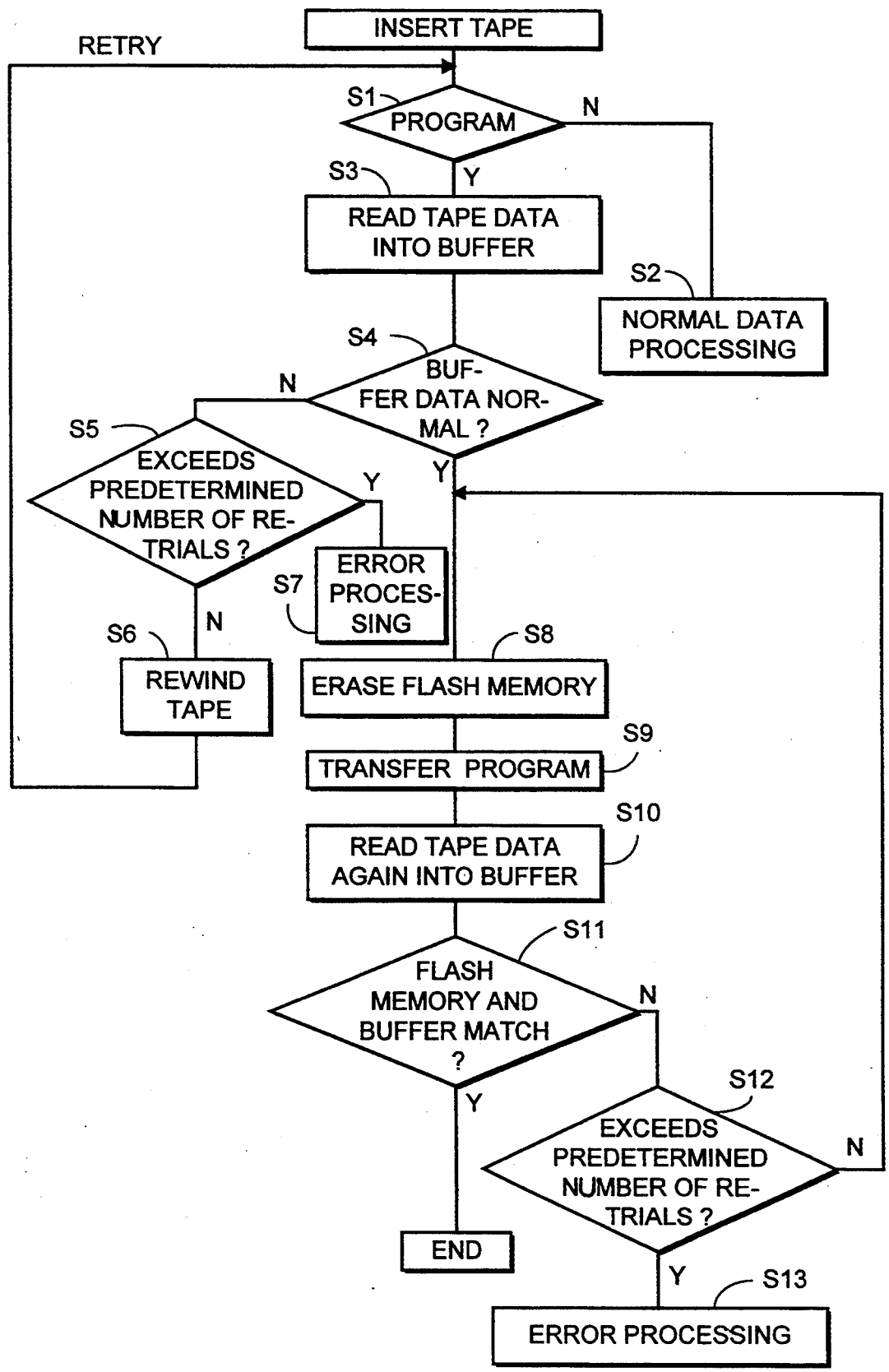
FIG. 3 a flowchart showing a program for modifying a program for the CPU in the streamer.

When the program stored in the flash memory 2 is to be modified, the operator sets the cassette 6a having the magnetic tape for modifying program into the main body 6. The CPU 1 receives a detecting signal from a switch which detects whether the cassette 6a has been set in the streamer or not, and when the cassette 6a is set in the streamer, it causes the main body 6 to reproduce data from the magnetic tape for modifying program in the cassette 6a by the magnetic head, takes in the data through the intermediary of the tape formatter controller 8 and executes the modification of the program stored in the flash memory 2 as shown in FIG. 3. A part of the program, steps S1 through S7 are stored in the flash memory 2 and steps S8 through S13 (program for rewriting program) are stored in the ROM 10 within the CPU 1.

That is, the CPU 1 first checks the signal reproduced from the magnetic tape in the cassette 6a by means of the magnetic head in step S1 to determine whether the information PCI which indicates that the magnetic tape is a magnetic tape for modifying program is recorded or not in the control block CB at the head portion of the magnetic tape in the cassette 6a to determine whether the magnetic tape in the cassette 6a is the normally used magnetic tape or the magnetic tape for modifying programs.

When the magnetic tape in the cassette 6a is the normally used magnetic tape, the CPU 1 advances to step S2 and executes a normal initialization operation.

When the magnetic tape in the cassette 6a is the magnetic tape for modifying program, the CPU 1 enters a program modifying operation. It finds a data block DB to be modified of the magnetic tape for modifying program from the control data recorded in the control block CB in the magnetic tape for modifying program in step S3 and causes the DMA controller 5 to carry out DMA transfer of the contents of the program to be modified reproduced from the data block DB by means of the magnetic head to the data buffer 7 through the intermediary of the tape formatter controller 8. Here, the capacity of the data buffer 7 is desirable to be larger than that of the program to be modified, i.e., larger than the capacity of the flash memory 2.

Codes such as ID code for verifying that the contents are correct are added to the program transferred to the data buffer 7 and the CPU 1 determines whether the contents of the program transferred to the data buffer 7 are correct or not. If the contents of the program transferred to the data buffer 7 are not correct, the CPU 1 causes the main body 6 to rewind the magnetic tape for modifying program in the cassette 6a to the first thereof in step S6 and then to retry the reproduction operations by repeating the aforementioned steps S1 through S4. When the contents of the program transferred to the data buffer 7 are not correct, the CPU 1 repeats this retrial and checks in step S5 whether the number of times of retrials has reached to a predetermined number of times (two or three times for example). The CPU 1 advances to step S7 and carries out an error processing if the contents of the program transferred to the data buffer 7 are not correct even after the number of retrials has reached the predetermined number of times. In this case, the program is not rewritten.

If the contents of the program transferred to the data buffer 7 are correct, the CPU 1 advances from step S4 to step S8 and erases the contents of the flash memory 2 by the program for rewriting program stored in the ROM 10 within the CPU 1. It then modifies the program by transferring and writing the program transferred to the data buffer 7 into the flash memory 2 in step S9. Then the CPU 1 causes the main body 6 to reproduce the program to be modified by the magnetic head from the magnetic tape for modifying program within the cassette 6a in the same manner and causes the DMA controller 5 to DMA transfer the program to the data buffer 7 through the intermediary of the tape formatter controller 8 in step S10. In step S11, the CPU 1 determines whether the contents of the data buffer 7 are correct or not by collating the contents of the flash memory 2 and that of the data buffer 7 and determining whether they match or not.

When the contents of the flash memory 2 and that of the data buffer 7 do not match, the CPU 1 repeats the aforementioned steps S8 through S11. When they still do not match, the CPU 1 repeats this retrial and checks whether the number of retrials has reached the predetermined number of times in step S12. When they do not match even after the number of retrials has reached the predetermined number of times, the CPU 1 advances to step S13 to execute error processing. When the contents of the flash memory 2 and that of the data buffer 7 match, the CPU 1 determines that the contents of the flash memory 2 are correct and ends the program modifying operation and the processing by executing the self-diagnosis program.

It should be noted, although the memory capacity of the ROM 10 in the CPU 1 may be small since the part of the program for modifying the program, i.e. steps S1 through S7, are stored in the flash memory 2 and steps S8 through S13 (program for rewriting program) are stored in the ROM 10 in the CPU 1, steps S1 through S13 need not be divided and stored in the flash memory 2 and the ROM 10 in the CPU 1 if all the steps S1 through S13 are stored in the ROM 10 within the CPU 1. Step S10 may be omitted since it is performed for corroboration. The present invention may be applied to a magnetic tape unit for recording and reproducing data other than the streamer for backing up data.

As described above, according to the present invention, a method for modifying program of a magnetic tape unit comprising a flash memory for storing programs a storage means and a CPU for executing the programs stored in the flash memory and storage means is provided. In the method, a program for rewriting program is stored in the storage means and when a magnetic tape is mounted in the magnetic tape unit, a discrimination is made whether the magnetic tape is a normally used recording medium or a medium for modifying program. If the magnetic tape is the medium for modifying program, a program to be modified reproduced from the magnetic tape is read into a buffer and the CPU erases the contents of the flash memory by the program for rewriting program stored in the storage means and transfers the program to be modified to the flash memory from the buffer, so that the magnetic tape unit automatically modifies the program even if the operator does not modify or notice the program to the magnetic tape unit by means of a special command or connector and no special connector or application program for the host need be provided. Furthermore, the streamer need not be taken out by disassembling a case and the like, so that the operator can modify the programs easily.

While the foregoing description and drawings represent the preferred embodiments of the present invention, it will be obvious to those skilled in the art that various changes and modifications may be made therein without departing from the true spirit and scope of the present invention.

What is claimed is:

1. A method for modifying a program in a magnetic tape unit comprising a flash memory storing a program to be modified, a storage means, and a CPU for executing programs stored in said flash memory and/or said storage means, comprising steps of:
    storing a program for rewriting program in said storage means;
    making a discrimination, when a magnetic tape is mounted in said magnetic tape unit, whether the magnetic tape is a normally used recording medium or a recording medium for modifying program;
    reading a program to be modified reproduced from the magnetic tape into a buffer when the magnetic tape is the medium for modifying program; and
    erasing contents of said flash memory by said CPU by means of the program for rewriting program stored in said storage means to transfer the program to be modified from said buffer to said flash memory.

2. The method for modifying program of a magnetic tape unit according to claim 1, wherein said other storage means is a ROM within the CPU.

3. The method for modifying program of a magnetic tape unit according to claim 1, wherein capacity of said buffer is larger than that of said flash memory.

4. The method for modifying program of a magnetic tape unit according to claim 1, wherein the transfer is carried out by DMA transfer.

5. The method for modifying program of a magnetic tape unit according to claim 1, wherein the program to be modified is recorded sequentially in the magnetic tape per each data block and information indicating that the magnetic tape is a recording medium for modifying program is recorded in a first block of the magnetic tape.

* * * * *